Patented Feb. 20, 1951

2,542,072

UNITED STATES PATENT OFFICE 2,542,072

SUSPENSIONS OF POLYMERIC CHLOROTRIFLUOROETHYLENE

Murray M. Sprung, Schenectady, N. Y., assignor to General Electric Company, a corporation of New York No Drawing. Application November 25, 1949, Serial No. 129,537

11 Claims. (Cl. 260—33.2)

This invention is concerned with suspensions of polymeric chlorotrifluoroethylene. More particularly, the invention relates to a suspension comprising (1) a dispersed phase of finely divided polymeric chlorotrifluoroethylene, and (2) a dispersing medium comprising a chlorinated organic ether. The invention also embraces methods for making the above-described suspensions.

Polymeric chlorotrifluoroethylene has been found to have good heat resistance and chemical resistance and because of this is eminently suitable for many applications where such properties are desired. Electrical conductors insulated with polymeric chlorotrifluoroethylene are capable of withstanding temperatures of the order of from about 150°–200° C. for long periods of time with little change in the physical characteristics or of the insulating properties of the polymeric insulation. Such polymeric material is also desired for many applications where its high softening point is an advantage. Thus, it is possible to mold various objects from the polymeric chlorotrifluoroethylene, either with or without fillers, to give useful articles which are dimensionally stable over a wide temperature range.

Because of its extreme chemical resistance and substantial insolubility in many of the common organic solvents, great difficulty has been experienced in obtaining the polymeric chlorotrifluoroethylene in usable form whereby it can be employed for coating or impregnating applications. Many attempts have been made to form solutions of the polymeric chlorotrifluoroethylene, but these attempts have generally been unsuccessful because the limit of solubility of the polymeric chlorotrifluoroethylene in the solvent has been so small as to render it impractical. Attempts to prepare suspensions of polymeric chlorotrifluoroethylene have also been generally unsuccessful because of the poor stability of such suspensions in the dispersing mediums employed heretofore with polymeric chlorotrifluoroethylene.

I have now discovered that for the first time it is possible to make relatively stable suspensions of polymeric chlorotrifluoroethylene using as the suspending medium a chlorinated organic ether as, for example, a chlorinated hydrocarbon ether. More particularly, I have found that I am able to make stable suspensions or dispersions of polymeric chlorotrifluoroethylene by first grinding the polymeric material, for instance, in a micropulverizer, to a fine particle size and thereafter mixing the finely divided polymer with a dispersing phase comprising a chlorinated organic ether, and finely grinding this mixture, for example, in a pebble mill or in a ball mill for a time sufficient to yield a stable, uniform suspension.

Suspensions made in accordance with my above described method are uniformly stable over long periods of time. I am able to prepare by my method smooth, creamy suspensions which can be obtained in two to three days' grinding time in standard ball mills and which are more uniform, less granular, less thixotropic, and have slower settling rates than those obtained from many other types of organic liquids. If there should be some slight settling out of the suspended polymeric material, it is possible by mere stirring either before use or during use to reinstate the suspension to its former acceptable state. Although some dispersions of similar polymers, e. g., polymeric tetrafluoroethylene, have been made using other materials as a dispersing phase, nevertheless, attempts to use the same dispersing media with polymeric chrorotrifluoroethylene have been generally unsuccessful.

Generally, the procedure followed for making my suspensions comprises pulverizing or grinding polymeric chlorotrifluoroethylene to a fine size of the order of about 0.2 to 25 microns, preferably, 1 to 15 microns. This may be accomplished by grinding the polymer in a micropulverizer used for such purposes. Thereafter, the finely ground polymer and chlorinated organic ether are mixed together and again ground, this time satisfactorily in either a ball mill or a pebble mill. The ratio by weight of chlorinated organic ether and finely divided polymer may be varied within wide limits depending upon the desired concentration of the final suspension. Thus, I may advantageously employ, by weight, from 0.01 to 1 or more parts of the polymer per part chlorinated organic ether. A good range which I have found useful comprises, by weight, from about 0.05 to 0.3 part polymer per part of chlorinated organic ether. On a percentage basis, good results may be realized when the polymer comprises about 10 per cent to 30 per cent, by weight, of the total weight of polymer and the dispersing phase, i. e., the chlorinated organic ether.

In order that those skilled in the art may better understand how the present invention may be practiced, the following example is given by way of illustration and not by way of limitation. All parts are by weight.

Polymeric chlorotrifluoroethylene (no strength temperature of 305° C.) was ground in a micropulverizer until the average particle size of the polymer was from about 1 to 15 microns. Thereafter, this finely divided polymer was mixed with the chlorinated organic ether described below in the table in the stipulated proportions and placed in a ball mill and milled for the stated period of time.

Table

| Sample No. | Parts of Ground Polymer | Dispersing Phase | Parts Dispersing Phase | Milling Time, Hours |
|---|---|---|---|---|
| 1 | 50 | β,β'-Dichlorodiethyl ether | 350 | 65 |
| 2 | 50 | β,β'-Dichlorodiethyl ether / Tetrachlorodiphenyl ether | 100 / 480 | 69 |
| 3 | 50 | β,β'-Dichlorodiisopropyl ether | 350 | 67 |
| 4 | 50 | β,β'-Dichlorodiisopropyl ether / Tetrachlorodiphenyl ether | 250 / 170 | 66 |
| 5 | 75 | β,β'-Dichlorodiethyl ether | 500 | 230 |

All the foregoing prepared suspensions were quite stable over long periods of time. In order to test their effectiveness as coating agents, each of the above samples with the exception of Sample 2 was applied to a thin aluminum wire by passing the latter through the respective suspension and up through a heated vertical baking oven maintained at an air temperature of between 300–450° C. Thereafter, each coated wire was examined to determine the type of coating thereon. In each case, the examination showed that the coating was flexible, uniform and well fused.

It will, of course, be apparent to those skilled in the art that in addition to the compositions described above, other concentrations of polymeric chlorotrifluoroethylene in the suspension may be employed without departing from the scope of the invention. The various ratios of ingredients which can advantageously be employed have been disclosed previously.

In addition to the chlorinated organic ethers mentioned above, other similar chlorinated compounds may also be employed. For example, I may use various chlorinated aliphatic ethers as, for example, chlorodimethyl ether (including its isomers, e. g., ClCH$_2$OCH$_3$, ClCH$_2$OCH$_2$Cl, etc.), chlorinated diethyl ether (including its isomers, e. g., ClCH$_2$CH$_2$OC$_2$H$_5$, Cl$_2$CHCH$_2$OC$_2$H$_5$, Cl$_2$CHCH$_2$OCH$_2$CH$_2$Cl, Cl$_3$CCH$_2$OCH$_2$CH$_2$Cl, etc.), chlorinated butyl ether, chlorinated isobutyl ether, chlorinated amyl ethers, etc.; chlorinated aryl ethers, e. g., chlorinated tolyl ethers, chlorinated xylyl ethers, chlorinated benzyl ethers, etc.; chlorinated mixed alkyl aryl ethers, e. g., chlorinated anisole, chlorinated phenetole, chlorinated phenyl beta-chloroethyl ether, etc. In general, in preparing my claimed suspensions, I may employ any liquid chlorinated hydrocarbon ether of the alkyl, aryl, alkaryl, aralkyl, and mixed alkyl and aryl series. Mixtures of such ethers may also be used in any desired proportion.

What I claim as new and desire to secure by Letters Patent of the United States is:

1. A suspension comprising (1) a dispersed phase of finely divided polymeric chlorotrifluoroethylene as the sole polymeric ingredient and (2) a dispersing medium comprising a chlorinated organic ether.

2. A suspension comprising (1) a dispersed phase of finely divided polymeric chlorotrifluoroethylene as the sole polymeric ingredient and (2) a dispersing medium comprising a chlorinated hydrocarbon ether.

3. A suspension comprising (1) a dispersed phase of finely divided polymeric chlorotrifluoroethylene as the sole polymeric ingredient and (2) a dispersing medium comprising beta,beta'-dichlorodiethyl ether.

4. A suspension comprising (1) a dispersed phase of finely divided polymeric chlorotrifluoroethylene as the sole polymeric ingredient and (2) a dispersing medium comprising beta-beta'-dichlorodiisopropyl ether.

5. A suspension comprising (1) a dispersed phase of finely divided polymeric chlorotrifluoroethylene as the sole polymeric ingredient and (2) a dispersing medium comprising tetrachlorodiphenyl ether.

6. A suspension comprising (1) a dispersed phase of finely divided polymeric chlorotrifluoroethylene as the sole polymeric ingredient and (2) a dispersing medium comprising beta,beta'-dichlorodiethyl ether and tetrachlorodiphenyl ether.

7. The method which comprises (1) forming a mixture of ingredients comprising (a) finely divided polymeric chlorotrifluoroethylene as the sole polymeric ingredient and (b) a chlorinated organic ether, and (2) grinding the mixture of ingredients until a homogeneous stable suspension is obtained.

8. The method which comprises (1) forming a mixture of ingredients comprising (a) finely divided polymeric chlorotrifluoroethylene as the sole polymeric ingredient and (b) beta,beta'-dichlorodiethyl ether, and (2) grinding the mixture of ingredients until a homogeneous stable suspension is obtained.

9. The method which comprises (1) forming a mixture of ingredients comprising (a) finely divided polymeric chlorotrifluoroethylene as the sole polymeric ingredient and (b) beta,beta'-dichlorodiisopropyl ether, and (2) grinding the mixture of ingredients until a homogeneous stable suspension is obtained.

10. The method which comprises (1) forming a mixture of ingredients comprising (a) finely divided polymeric chlorotrifluoroethylene as the sole polymeric ingredient and (b) tetrachlorodiphenyl ether and (2) grinding the mixture of ingredients until a homogeneous stable suspension is obtained.

11. The method which comprises (1) forming a mixture of ingredients comprising (a) finely divided polymeric chlorotrifluoroethylene as the sole polymeric ingredient and (b) beta,beta'-dichlorodiethyl ether and tetrachlorodiphenyl ether, and (2) grinding the mixture of ingredients until a homogeneous stable suspension is obtained.

MURRAY M. SPRUNG.

REFERENCES CITED

The following references are of record in the file of this patent:

UNITED STATES PATENTS

| Number | Name | Date |
|---|---|---|
| 2,393,967 | Brubaker | Feb. 5, 1946 |